*cited by examiner

(12) United States Patent
Farago et al.

(10) Patent No.: US 6,934,825 B1
(45) Date of Patent: Aug. 23, 2005

(54) BI-DIRECTIONAL STACK IN A LINEAR MEMORY ARRAY

(75) Inventors: Steven Robert Farago, Austin, TX (US); Robert James Ramirez, Chicago, IL (US); Kenneth Lee Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 09/671,513

(22) Filed: Sep. 21, 2000

(51) Int. Cl.$^7$ ............................................... G06F 12/00
(52) U.S. Cl. ..................... 711/170; 711/171; 711/172; 711/145; 707/100; 707/101
(58) Field of Search .................. 711/170, 171, 711/172, 145; 707/100, 101

(56) References Cited

U.S. PATENT DOCUMENTS 5,655,133 A * 8/1997 Dupree et al. ................. 712/23

FOREIGN PATENT DOCUMENTS

JP 01-177126 7/1989 ............. G06F/9/34

OTHER PUBLICATIONS

James F. Korsh and Gary Laison, *A Multiple–Stack Manipulation Procedure*, Research Contributions, Nov. 1983, vol. 26, No. 11, pp. 921–923.
Knuth, Stanford University, *The Art of Computer Programming*, Second Edition, vol. 1 / Fundamental Algorithms, pp. 239–248.
Jan V. Garwick, *Data Storage in Compilers*, T4 (1964), pp. 137–140.
Toshinori Munakata, *Dynamic Initial Allocation and Local Reallocation Procedures for Multiple Stacks*, Research Contributions, Feb. 1986, vol. 29, No. 2, pp. 134–141.
Chien et al., "A dynamic strategy for multiple stacks manipulation", Computer Software and Applications Conference, 1991. COMPSAC '91, US, IEEE, Sep. 1991, pp. 436–441.

* cited by examiner

*Primary Examiner*—Kimberly McLean-Mayo
(74) *Attorney, Agent, or Firm*—Duke W. Yee; Casimer K. Salys; Francis Lammes (57) ABSTRACT

A method, system, and apparatus for placing and removing data elements into a bi-directionally growing first in last out data structure is provided. In one embodiment, in response to a request to place a data element into the data structure, a head pointer is advanced one memory location in a direction indicated by a state of a direction flag. The new data element is placed into the memory location indicated by the head pointer. The position of the head pointer and the base pointer are swapped in preparation for receiving a new data element and the state of the direction flag is reversed to indicate growth of the data structure in the opposite direction. In response to a request to remove a data element from the data structure, the head and base pointers are swapped and the state of the direction flag is reversed. The element indicated by the location pointed to by the head pointer is removed and the head pointer retreats one memory location position in a direction opposite the direction indicated by the direction flag.

20 Claims, 6 Drawing Sheets

ONE BI-DIRECTIONAL
STACK
600

*FIG. 6A*

TWO BI-DIRECTIONAL
STACKS
600

*FIG. 6B*

THREE BI-DIRECTIONAL
STACKS
600

BI-DIRECTIONAL STACK IN A LINEAR MEMORY ARRAY

CROSS REFERENCE TO RELATED APPLICATIONS

The present application is related to the following applications which are assigned to the same assignee and filed on the same date as the present application, and are hereby incorporated herein by reference:

"Split Bi-directional Stack in a Linear Memory Array," U.S. Pat. No. 6,643,662; and "Proportionally Growing Stack in a Linear Memory Array," U.S. Pat. No. 6,629,228.

BACKGROUND OF THE INVENTION

1. Technical Field

The present invention is related generally to an improved data processing system and, more particularly, to an improved first in last out data structure within a memory array.

2. Description of Related Art

Figure 1A:
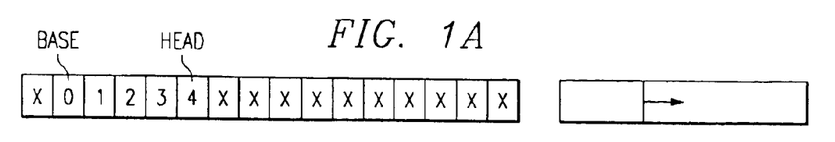
FIG. 1A–1B depict stacks with five and ten elements respectively that grow to the right in accordance with the prior art.
Figure 1B:
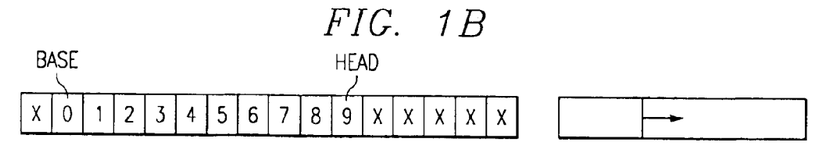
Figure 2A:
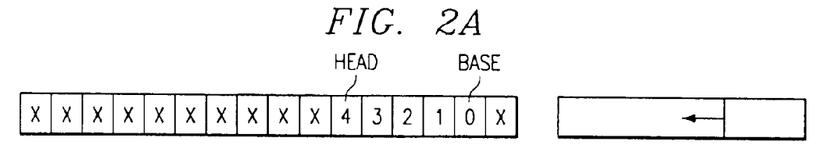
FIGS. 2A–2B depict a stacks with five and ten elements respectively that grow to the left in accordance with the prior art.
Figure 2B:
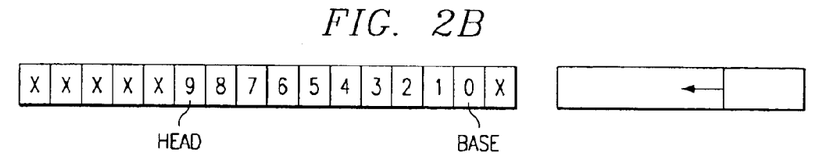

A stack or First In Last Out (FILO) data structure is used in many computer applications. Often multiple stacks are needed in a single application and they are added on an as needed basis because, at the beginning of the application, it is not known how many stacks will be needed. Since memory in computer systems is arranged as a linear array, the application will have some segment of this linear array that it will use to place multiple stacks. The way stacks are traditionally implemented is with a base and head pointer. A stack with five elements growing to the right is shown in FIG. 1A. FIG. 1B shows the same stack as in FIG. 1A with 10 elements. FIG. 2A depicts a stack with five elements that grows to the left. As more elements are added to the stack, the head moves in memory to the left as depicted in FIG. 2B where the head has moved to element 9.

In an application, the first stack is chosen to be either a right or a left growing stack and is placed at the opposite end of the linear array from the direction of stack growth. Thus, if the first stack is a right growing stack, then the first element in the stack is placed at the left end of the memory array. For this discussion, assume that a right growing stack is chosen first. If an additional stack is then needed, the additional stack is chosen to be a left growing stack and is placed in the right of the array. Thus, we end with the situation depicted in FIG. 3 where the first stack 302 is a right growing stack placed at the left end of the memory array 300 and the second stack 304 is a left growing stack placed at the right end of the memory array 300.

Figure 3:
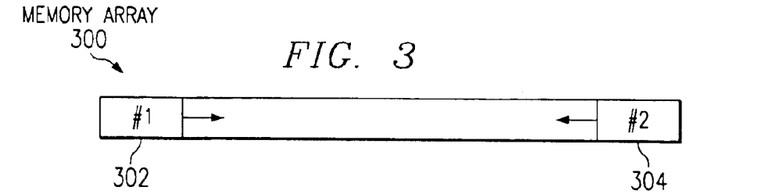
FIG. 3 depicts a prior art memory array containing two stacks at opposite ends of the memory array wherein each stack may grow until it hits the opposite stack coming from the opposite direction.
Figure 4:
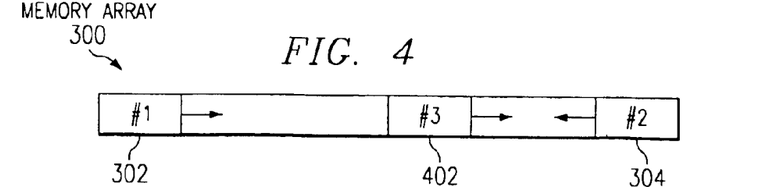
FIG. 4 depicts a prior art memory array containing three stacks.

In the case depicted in FIG. 3, in which two stacks are placed at opposite ends of the memory array 300, each stack 302–304 may grow until it hits the opposite stack coming from the opposite direction (which is referred to as a collision). This case is considered to be very efficient because, if all the stacks 302–304 grow at the same rate, all memory within the memory array 300 will be consumed before a collision. However, if a third stack is needed, a dilemma is encountered. The third stack can be placed in the middle of the first two stacks as depicted in FIG. 4, thus leaving room for a fourth stack. However, if the application does not need a fourth stack, stack #3 402 will collide with stack #2 304 long before stack #1 302 has used all its space.

It has been shown that with this method of laying out stacks, even numbers of stacks are more efficient at using the given memory array space that are odd numbers of stacks. Thus, if the application happens to favor an odd number of stacks, the application will not use memory efficiently. Therefore, a method of organizing stacks within a memory array that utilizes available memory space more efficiently for both odd and even numbers of stacks is desirable.

SUMMARY OF THE INVENTION

The present invention provides a method for placing and removing data elements into a bi-directionally growing first in last out data structure. In one embodiment, in response to a request to place a data element into the data structure, a head pointer is advanced one memory location in a direction indicated by a state of a direction flag. The new data element is placed into the memory location indicated by the head pointer. The position of the head pointer and the base pointer are swapped in preparation for receiving a new data element and the state of the direction flag is reversed to indicate growth of the data structure in the opposite direction. In response to a request to remove a data element from the data structure, the head and base pointers are swapped and the state of the direction flag is reversed. The element indicated by the location pointed to by the head pointer is removed and the head pointer retreats one memory location position in a direction opposite the direction indicated by the direction flag.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 5:
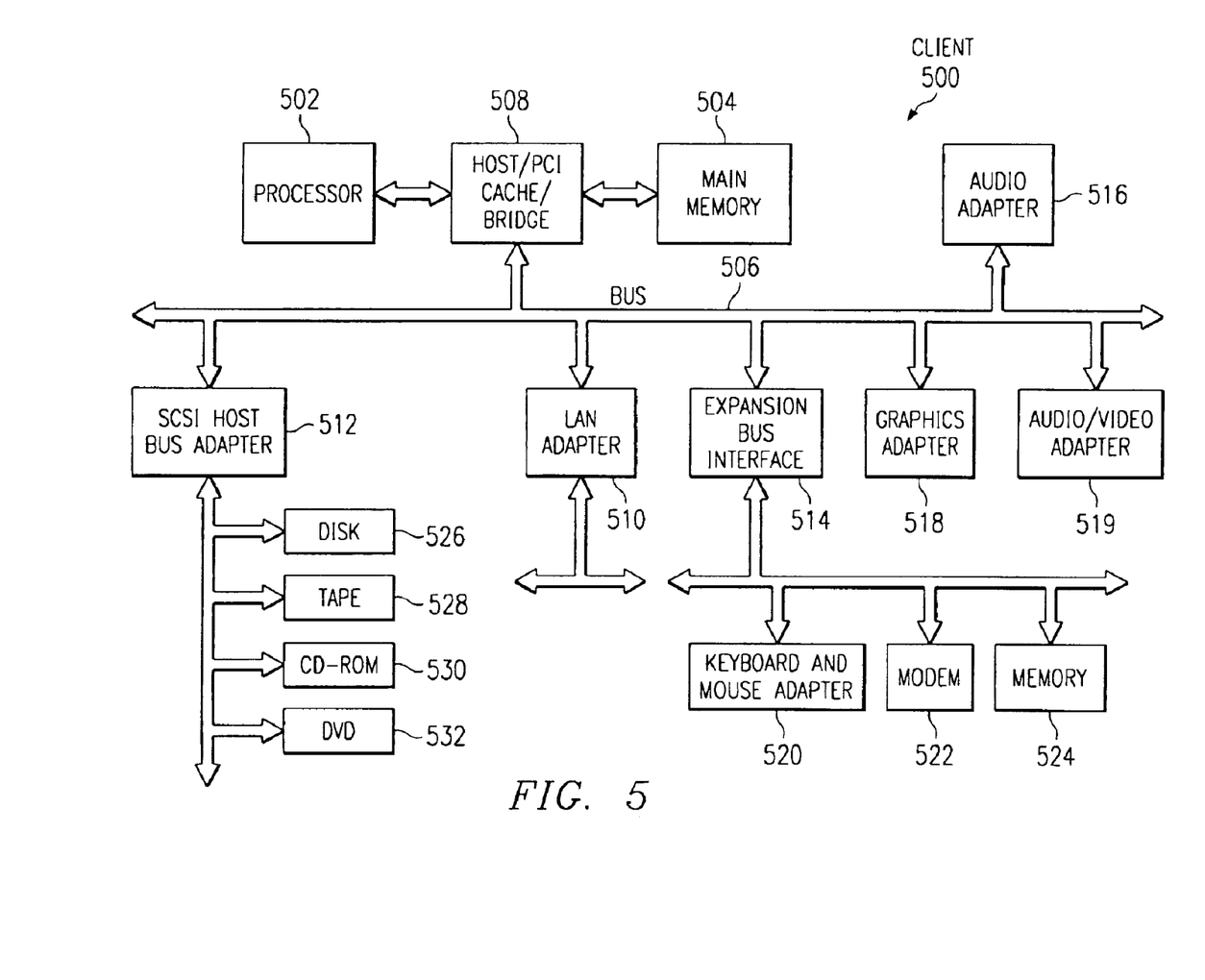
FIG. 5 depicts a block diagram of a data processing system in which the present invention may be implemented.

With reference now to FIG. 5, a block diagram of a data processing system in which the present invention may be implemented is illustrated. Data processing system 500 employs a peripheral component interconnect (PCI) local bus architecture. Although the depicted example employs a PCI bus, other bus architectures, such as Micro Channel and ISA, may be used. Processor 502 and main memory 504 are connected to PCI local bus 506 through PCI bridge 508. PCI bridge 508 may also include an integrated memory controller and cache memory for processor 502. Additional connections to PCI local bus 506 may be made through direct component interconnection or through add-in boards. In the depicted example, local area network (LAN) adapter 510, SCSI host bus adapter 512, and expansion bus interface 514 are connected to PCI local bus 506 by direct component connection. In contrast, audio adapter 516, graphics adapter 518, and audio/video adapter (A/V) 519 are connected to PCI local bus 506 by add-in boards inserted into expansion slots. Expansion bus interface 514 provides a connection for a keyboard and mouse adapter 520, modem 522, and additional memory 524. In the depicted example, SCSI host bus adapter 512 provides a connection for hard disk drive 526, tape drive 528, CD-ROM drive 530, and digital video disc read only memory drive (DVD-ROM) 532. Typical PCI local bus implementations will support three or four PCI expansion slots or add-in connectors.

An operating system runs on processor 502 and is used to coordinate and provide control of various components within data processing system 500 in FIG. 5. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 500. Instructions for the operating system, the object-oriented operating system, and applications or programs are located on a storage device, such as hard disk drive 526, and may be loaded into main memory 504 for execution by processor 502.

Those of ordinary skill in the art will appreciate that the hardware in FIG. 5 may vary depending on the implementation. For example, other peripheral devices, such as optical disk drives and the like, may be used in addition to or in place of the hardware depicted in FIG. 5. The depicted example is not meant to imply architectural limitations with respect to the present invention. For example, the processes of the present invention may be applied to multiprocessor data processing systems.

Figure 6A:
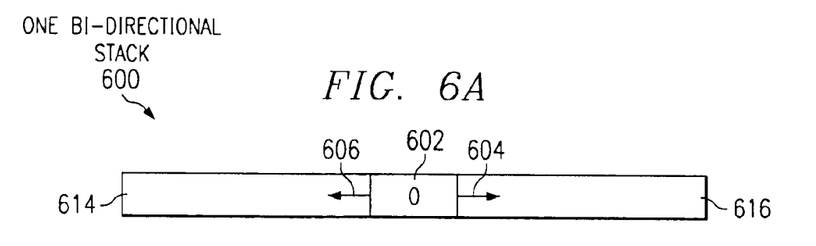
FIGS. 6A–6C depict memory arrays containing one, two, and three stacks respectively that grow bi-directionally in accordance with the present invention.
Figure 6B:
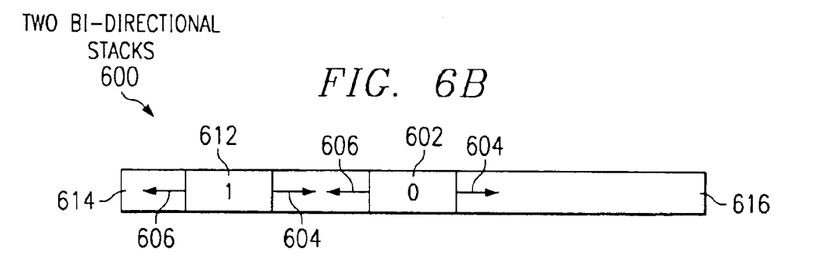
Figure 6C:
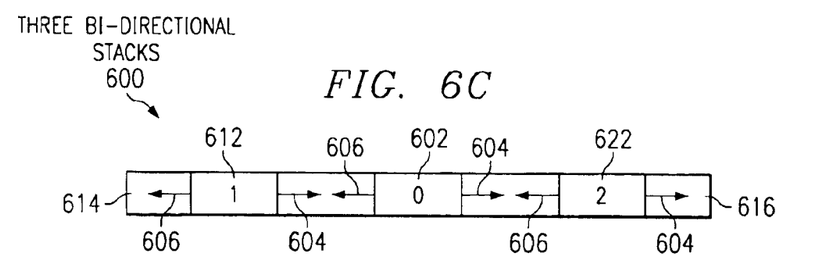

With reference now to FIGS. 6A–6C, memory arrays containing one, two, and three stacks respectively that grow bi-directionally are depicted in accordance with the present invention. Memory array 600 may be implemented within a computer memory such as, for example, main memory 504 illustrated in FIG. 5. As provided by the present invention, a stack or First In Last Out (FILO) data structure may grow in two directions at once. As used herein, stacks and FILOs are equivalent terms. By having the FILO data structure grow in two directions at once, a more efficient use of memory can be made for cases involving an odd number of stacks.

In FIG. 6A, memory array 600 includes a single stack 602 that may grow in two directions 604 and 606. As depicted in FIG. 6A, stack 602 has been located approximately in the center of memory array 600 such that additional stacks may be placed in between stack 602 and the edges 614 and 616 of memory array 600 as needed. As new elements are added to stack 602, the first element is added to, for example, the right 604, and then the second element is added to the next location on the left 606. The third element would then be added to the next location on the right 604 of stack 620 and so on. Stack 602 may then continue to grow bi-directionally (i.e. both in the right direction 604 and in the left direction 606) until the limits 614 and 616 of the memory array have been reached.

In FIG. 6B, a second stack 612 has been added to memory array 600 such that the memory array 600 contains two stacks that grow in a bi-directional manner. The second stack 612, in the present example, is located approximately halfway between the stack 602 and the left edge 614 of memory array 600 such that additional stacks may be placed in between stack 602 and stack 612 and between stack 612 and the edge 614 of memory array 600 as needed. Elements are added to stack 612 in a similar fashion to that of stack 602.

In FIG. 6C, a third stack 622 has been added to memory array 600. Stack 622 has been located approximately halfway between stack 602 and the left edge 616 of memory array 616 such that additional stacks may be inserted into memory array 600 as needed by a software application. Stack 622 grows bi-directionally in a similar fashion to stack 602. Stacks 602, 612, and 622 may continue to grow bi-directionally until each collides with another one of stacks 602, 612, and 622 or with an edge 614 and 616.

Assuming that each stack grows at the same rate, it can be seen from FIGS. 6A–6C that odd numbers of bi-directionally growing stacks, such as depicted in FIG. 6A and FIG. 6C, use memory more efficiently than in the uni-directionally growing stacks of the prior art as depicted, for example, in FIG. 4. However, even numbers of bi-directionally growing stacks, such as depicted in FIG. 6B, may use memory less efficiently than the uni-direction growing stacks of the prior art.

The bi-directionally growing stacks of the present invention modify two main functions used in the implementation of a standard prior art stack. These functions are the push and the pop functions. A push function is the process of writing the next element into the stack and the pop function is the process of extracting from the stack starting with the last element written into the stack.

For a multi-stack environment, several pieces of information about each stack should be recorded. One piece of information that should be recorded is the direction of stack growth. This determines whether a head pointer is incremented or decremented during a push or a pop operation. The head pointer indicates the location of the data most recently written into the stack (i.e. the last data in). A base pointer indicates the extent of the stack within the memory array by indicating the memory location opposite the head thus providing the opposite bounds of the stack to the bounds provided by the head pointer. For a right growing stack, the head pointer is incremented for a push and decremented for a pop. For a left growing stack, this is reversed. The second and third pieces of information that should be recorded are the location of the stack's head and base pointers. Depending on the implementation, there may be other information that should be recorded as well.

Figure 7A:
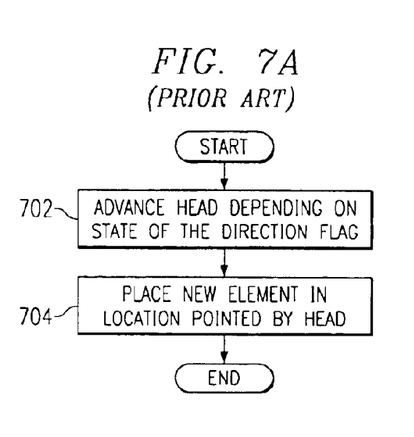
FIG. 7A depicts a flowchart illustrating a method of pushing data to a conventional prior art uni-directional stack.

With reference now to FIG. 7A, a flowchart illustrating a method of pushing data to a conventional prior art uni-directional stack is depicted in order to provide a point of contrast with the methods and data structures of the present invention. To begin, when a new data element is to be written to the stack, the head position is advanced depending on the state of the direction flag (step 702). For example, if the direction flag is to the right, then the head position is incremented. The new data element is then placed in the location pointed to by the head pointer (step 704).

Figure 7B:
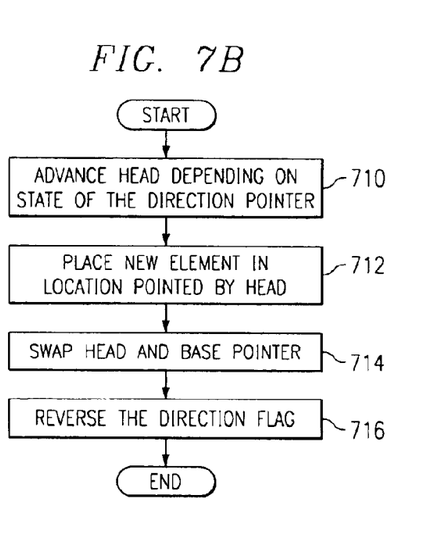
FIG. 7B depicts a flowchart illustrating an exemplary process for pushing data to a bi-directionally growing stack in accordance with the present invention.
Figure 8A:
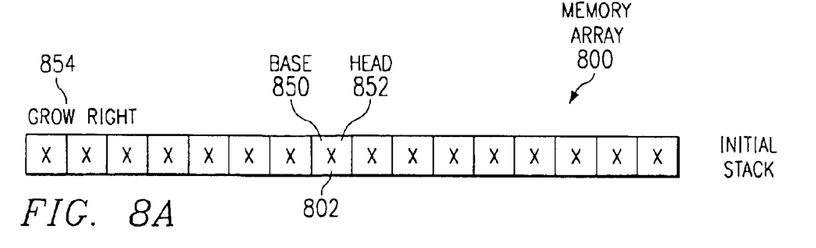
FIG. 8 depicts an example of head pointer position, base pointer position and direction flag after several pushes to a stack in accordance with the present invention.
Figure 8B:
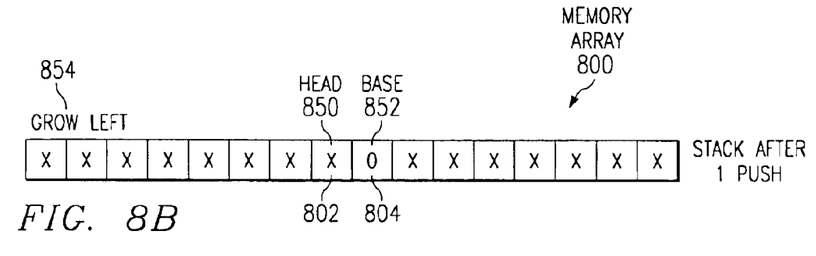
Figure 8C:
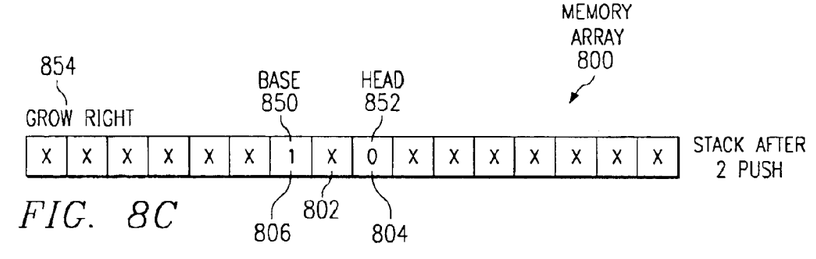
Figure 8D:
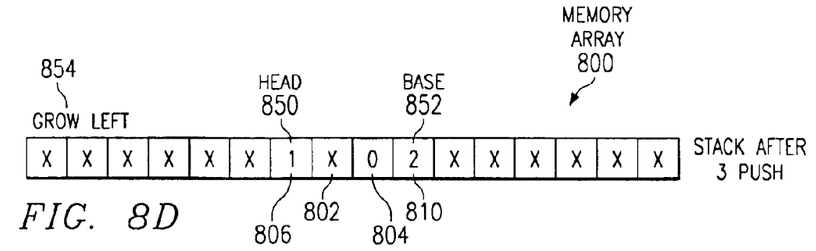
Figure 8E:
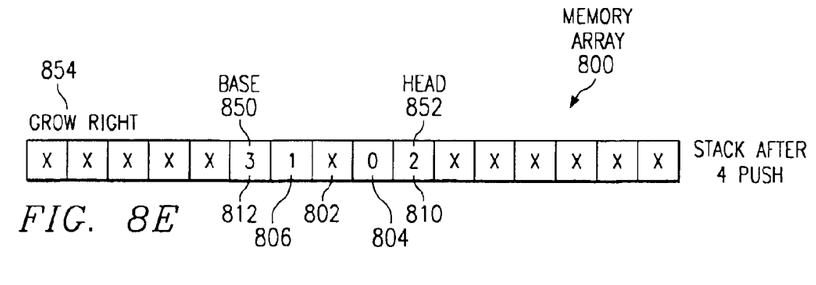

With reference now to FIG. 7B, a flowchart illustrating an exemplary process for pushing data to a bi-directionally growing stack is depicted in accordance with the present invention. To begin, when a new data element is to be pushed to the stack, the head pointer position is advanced depending on the state of the direction pointer (step 710). For example, if the direction pointer is pointing to the right, then the head pointer position is incremented. However, if the direction pointer is pointing to the left, then the head pointer position is decremented. The new data element is then placed into the location indicated by the head pointer (step 712). The locations of the head pointer and base pointer are then swapped (step 714) and the direction flag is reversed (step 716).

With reference now to FIG. 8, a block diagram providing an example of head pointer position, base pointer position and direction flag after several pushes to a stack is depicted in accordance with the present invention. Memory array 800 may be implemented within a memory within a data processing system, such as, for example, main memory 504 depicted in FIG. 5. In the initial stack configuration in memory array 800, before any data elements have been pushed to the stack, the base pointer 852 and the head pointer 850 both point to initial memory array 800 location 802, which is approximately in the middle of memory array 800. The direction flag 854 indicates that stack growth is to the right.

When a new data element (i.e. data element 0) is pushed to the stack, the head position is advanced one position to the right to location 804, the new element is placed into location 804, the head 852 and base 850 pointer positions are reversed, and the direction indicated by the direction flag 854 is reversed from right to left. Thus after one push to the stack, the head pointer 852 points to memory location 802, the base pointer 850 points to memory location 804, and the direction flag 854 indicates that growth is to the left.

When the second data element (i.e. data element 1) is pushed to the stack, the head pointer 852 position is advanced one position to the left (i.e. decremented) to memory location 806, the $1^{st}$ data element is placed into memory location 806, the head 852 and base 850 pointer positions are reversed, and the direction indicated by the direction flag 854 is reversed from left to right. Thus, after two pushes, the head pointer 852 points to memory location 804, the base pointer 850 points to memory location 806, and the direction flag 854 indicates that growth is to the right.

When the third data element (i.e. data element 3) is pushed to the stack, the head pointer 852 position is once again advanced one position to the right (i.e. incremented) to memory location 810, the new data element is placed into memory location 810, the head 852 and base 850 pointer positions are reversed, and the direction of growth indicated by the direction flag 854 is reversed. Thus, after the third push, the head pointer 852 points to memory location 806, the base pointer 850 points to memory location 810, and the direction of growth indicated by the direction flag 854 is to the left.

When the fourth data element (i.e. data element 3) is pushed to the stack, the head pointer 852 position is advanced one position to the left (i.e. decremented) to memory location 812, the data element 3 is placed into memory location 812, the base 850 and head 852 pointers positions are reversed, and the direction of growth indicated by direction flag 854 is switched to right.

Figure 9A:
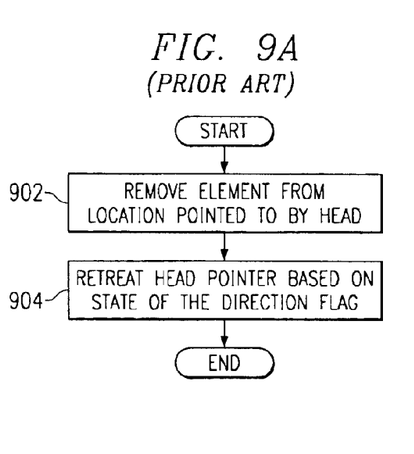
FIG. 9A depicts a flowchart illustrating an example of a method of popping data from a conventional prior art uni-directional stack.

With reference now to FIG. 9A, a flowchart illustrating an example of a method of popping data from a conventional prior art uni-directional stack is depicted in order to provide a point of contrast with the methods and data structures of the present invention. When the last data into a stack (FILO) is to be removed, the element from the location pointed to by the head pointer is removed (step 902). The position of the head pointer is retreated based on the state of the direction flag (step 904). For example, if the direction flag indicates growth to the right, then the head pointer is decremented.

Figure 9B:
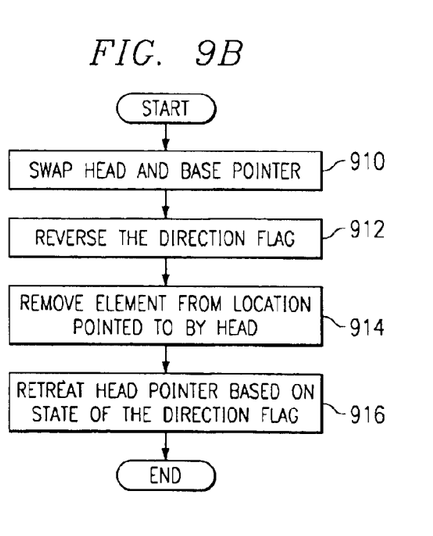
FIG. 9B depicts a flowchart of an exemplary method of removing data elements from a bi-directionally growing stack in accordance with the present invention.
Figure 10A:
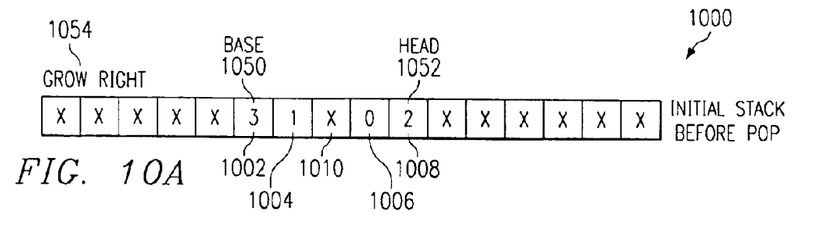
FIG. 10 depicts a block diagram illustrating an exemplary method of removing elements from a bi-directional stack in accordance with the present invention.
Figure 10B:
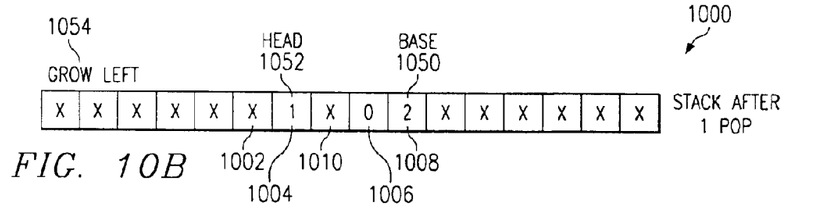
Figure 10C:
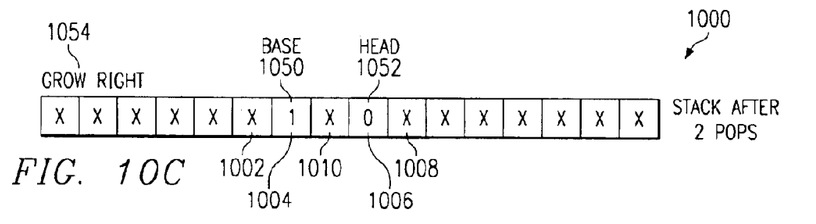
Figure 10D:
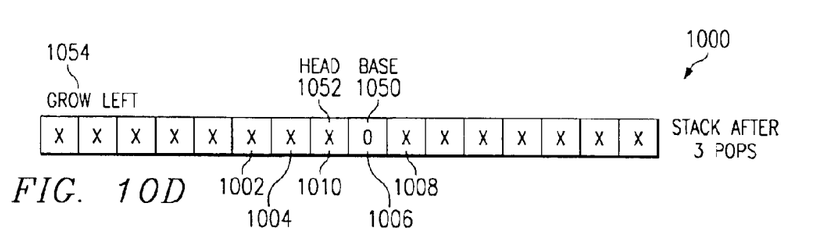
Figure 10E:
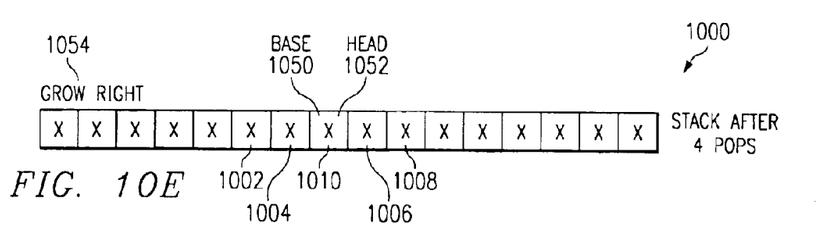

With reference now to FIG. 9B, a flowchart of an exemplary method of removing data elements from a bi-directionally growing stack is depicted in accordance with the present invention. When an software application requests to remove a data element from a stack, the head and base pointer positions are swapped (step 910) and the direction of growth indicated by the direction flag is reversed (step 912). The element in the location indicated by the head pointer is removed (step 914) and sent to the requesting application. Finally, the head pointer position is retreated one position based on the state of the direction flag (step 916).

With reference now to FIG. 10, a block diagram illustrating an exemplary method of removing elements from a bi-directional stack is depicted in accordance with the present invention. Initially, before any elements have been removed (popped) from the stack in memory array 1000, the base pointer 1050 is pointing to element 3 in memory location 1002 in memory array 1000 and head pointer 1052 is pointing to element 2 in memory location 1008. Element 3 in memory location 1002 is the last element placed into the stack and will be the first element removed from the stack. The direction flag 1054 indicates that growth of the stack is to the right.

When an element is removed from the stack, the element most recently placed into the stack is the first element removed from the stack. Thus, in the present example, when an application requests to remove an element, the head pointer 1052 and the base pointer 1050 will be reversed since the head pointer initially is pointing to the memory location 1008 immediately preceding the memory location to which the next element would be placed, should the stack continue to grow, rather than pointing to the last element placed into the stack (element 3 in memory location 1002). The direction flag is then reversed to indicate growth to the left and element 3 in memory location 1002 is removed. The head pointer 1050 then retreats one memory position to the right since the direction flag indicates growth to the left. Thus, after 1 pop, the head pointer 1050 points to element 1 in memory location 1004, the base pointer 1052 points to element 2 in memory location 1008, and the direction flag indicates that growth of the stack is to the left.

When the next element is removed form the stack in memory array 1000, the head pointer 1050 and the base pointer 1052 are again swapped and the direction flag 1054 is reversed to indicate growth to the right. Element 2 in memory location 1008 is then removed since this where the head pointer 1052 now points. The head pointer 1052 then retreats one position to the left since the direction flag indicates growth to the right. Thus, after 2 pops, the head pointer 1052 points to element 0 in memory location 1006, the base pointer 1050 points to element 1 in memory location 1004, and the direction flag 1054 indicates the direction of growth of the stack is to the right.

When the next element (element 1) is removed from the stack, the head pointer 1052 and the base pointer 1050 are again swapped such that the head pointer 1052 points to element 1 in memory location 1004 and the base pointer 1050 points to element 0 in memory location 1006. The direction of the direction flag 1054 is reversed such that the direction of growth indicated by the direction flag 1054 is to the left. Element 1 in memory location 1004 is then removed from the stack and the head pointer 1052 retreats one memory location to the right such that is points to memory location 1010 (a memory location that is empty). Thus, after 3 pops, the head pointer 1052 points to memory location 1010, the base pointer 1050 points to memory location 1006, and the direction flag 1054 indicates that stack growth is to the left.

When the final element is removed from the stack, the base pointer 1050 and the head pointer 1052 are swapped such that the head pointer 1052 points to element 0 in memory location 1006 and the base pointer 1050 points to memory location 1010. The direction of the direction flag 1054 is reversed to indicate that the direction of stack growth is to the right. Element 0 in memory location 1006 is then removed and the head pointer 1052 retreats one memory position to the left such that it points to memory location 1010. Thus, after 4 pops, the base pointer 1050 and the head pointer 1052 both point to memory location 1010 (an empty memory location) since all data elements have been removed from the stack. Also, after 4 pops, the direction of the direction flag 1054 indicates that the direction of stack growth is to the right.

Although the present invention has been described primarily with reference to modifications necessary to change a uni-directionally growing dead element stack into a bi-directionally growing dead element stack, ones skilled in the art will recognize that the present invention may be applied to create other types of bi-directionally growing stacks. For example, the present invention may be applied to create a bi-directionally growing used element stack rather than a dead element stack. In a used element stack, the memory location that both the head and base pointer point to prior to beginning the stack is used to store an element. However, in a dead element (or empty element) stack, as described above, the memory location in which both the head pointer and base pointer originate before the stack begins, is not used to store an element. Other types of stacks may be modified as well to create bi-directionally growing stacks. Thus, the present invention is not limited to dead element stacks.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing data elements in bi-directionally growable data structure, the method comprising:

responsive to an indication that a data element is to be placed into the data structure:
advancing a head pointer one memory location in a direction indicated by a state of a direction flag; and
placing a new data element into the memory location indicated by the head pointer;
swapping the position of the head pointer and a base pointer; and
reversing the state of the direction flag to indicate growth in the opposite direction in preparation for receiving another data element.

2. The method as recited in claim 1, further comprising:
responsive to an indication that a data element is to be removed from the data structure:
swapping the head and the base pointers;
reversing the state of the direction flag; and
removing the data element from the memory location indicated by the head pointer.

3. The method as recited in claim 2, further comprising:
moving the head pointer by one memory location in a direction opposite a direction indicated by the state of the direction flag.

4. The method as recited in claim 1, wherein the data structure is a first in last out data structure.

5. The method as recited in claim 1, wherein the data structure is a stack data structure.

6. A computer program product in a computer readable media for use in a data processing system for managing data elements in bi-directionally growable data structure, the computer program product comprising:

first instructions, responsive to an indication that a data element is to be placed into the data structure:
for advancing a head pointer one memory location in a direction indicated by a state of a direction flag; and
for placing a new data element into the memory location indicated by the head pointer;
second instruction for swapping the position of the head pointer and a base pointer; and
third instructions for reversing the state of the direction flag to indicate growth in the opposite direction in preparation for receiving another data element.

7. The computer program product as recited in claim 6, further comprising:
second instructions, responsive to an indication that a data element is to be removed from the data structure:
for swapping the head and the base pointers;
for reversing the state of the direction flag; and
for removing the data element from the memory location indicated by the head pointer.

8. The computer program product as recited in claim 7, further comprising:
third instructions for moving the head pointer by one memory location in a direction opposite a direction indicated by the state of the direction flag.

9. The computer program product as recited in claim 6, wherein the data structure is a first in last out data structure.

10. The computer program product as recited in claim 6, wherein the data structure is a stack data structure.

11. A system for managing data elements in bi-directionally growable data structure, the system comprising:
first means, responsive to an indication that a data element is to be placed into the data structure:
for advancing a head pointer one memory location in a direction indicated by a state of a direction flag; and
for placing a new data element into the memory location indicated by the head pointer;
second means for swapping the position of the head pointer and a base pointer; and
third means for reversing the state of the direction flag to indicate growth in the opposite direction in preparation for receiving another data element.

12. The system as recited in claim 11, further comprising:
second means responsive to an indication that a data element is to be removed from the data structure:
for swapping the head and the base pointers;
for reversing the state of the direction flag; and
for removing the data element from the memory location indicated by the head pointer.

13. The system as recited in claim 12, further comprising:
third means for moving the head pointer by one memory location in a direction opposite a direction indicated by the state of th direction flag.

14. The system as recited in claim 11, wherein the data structure is a first in last out data structure.

15. The system as recited in claim 11, wherein the data structure is a stack data structure.

16. A data processing system, comprising:
a processor; and
a memory; wherein
the memory comprises a bi-directionally growing stack, wherein the bi-directionally growing stack comprises at least one of a dead element stack and a used element stack.

17. A memory system, comprising:
a linear memory array; and
a stack stored in said linear memory array;
wherein as elements are added to the stack, each of the added elements is placed into a next empty memory location at an opposite end of the stack from the end of the stack that a previously added element was placed.

18. The memory system as recited in claim 17, wherein the stack is a dead element stack.

19. The memory system as recited in claim 17, wherein the stack is a used element stack.

20. The memory system as recited in claim 17, wherein as elements are removed from the stack, a next element removed is removed from a memory location at an opposite end of the stack from a location of a previously removed element.

* * * * *

UNITED STATES PATENT AND TRADEMARK OFFICE
CERTIFICATE OF CORRECTION

PATENT NO. : 6,934,825 B1
DATED : August 23, 2005
INVENTOR(S) : Farago et al.

It is certified that error appears in the above-identified patent and that said Letters Patent is hereby corrected as shown below:

<u>Column 9,</u>
Line 29, after "state of" delete "th" and insert -- the --.

Signed and Sealed this

Twenty-third Day of May, 2006

JON W. DUDAS
*Director of the United States Patent and Trademark Office*